United States Patent [19]

Arai et al.

[11] 4,006,448

[45] Feb. 1, 1977

[54] CENTRALIZED MONITOR SYSTEM FOR MOTOR VEHICLES

[75] Inventors: Hiroshi Arai; Jun Ohta, both of Aichi, Japan

[73] Assignee: Toyota Jidosha Kogyo Kabushiki Kaisha, Toyota, Japan

[22] Filed: May 19, 1975

[21] Appl. No.: 578,964

[30] Foreign Application Priority Data

Jan. 14, 1975 Japan .................................. 50-6592

[52] U.S. Cl. .............................. 340/52 F; 340/412

[51] Int. Cl.[2] .......................................... B60Q 1/00

[58] Field of Search ................. 340/52 F, 412, 413, 340/414, 415; 307/10 R

[56] References Cited

UNITED STATES PATENTS

| | | | |
|---|---|---|---|
| 3,626,367 | 12/1971 | Howard | 340/52 F |
| 3,683,197 | 8/1972 | Ives | 307/10 R |

*Primary Examiner*—Alvin H. Waring

*Attorney, Agent, or Firm*—Pollock, Vande Sande & Priddy

[57] ABSTRACT

A centralized monitor system for motor vehicles of the "failure-proof" type including display lamps for indication of trouble sources and a primary warning lamp which are activated by respective switching circuits connected to respective sensors. Its feature is that even if any switching circuit fails or is damaged to make the display lamp inactive, the primary warning lamp nevertheless is activated to give a warning of such latent failure of possible occurrence in the switching circuit.

8 Claims, 2 Drawing Figures

CENTRALIZED MONITOR SYSTEM FOR MOTOR VEHICLES

BACKGROUND OF THE INVENTION

This invention relates to an improved centralized monitor system for use in motor vehicles.

As is generally appreciated in the engineering field of motor vehicles e.g. automobiles, it is highly effective for securing safety in operation that the working condition or functioning of a number of essential parts incorporated therein be constantly monitored so that abnormal or prohibitive operating conditions, if any, occurring thereat will be proptly sensed. Such parts or objects to be monitored include, by way of example, functionings of various display lamps, capacities of batteries, quantities of stored fluid consumables e.g. engine oil, window-washer water, coolants and the like, or wear of brake linings, etc. For these monitoring purposes, there has been known a centralized monitor system for automobile use of the type by which a car driver, as seated, may check up instantly every item of the above described objects to be monitored. Such ordinary system generally includes a plurality of display means e.g. lamps for indication of respective trouble sources, a primary warning means e.g. a lamp for the first-warning purpose, and a corresponding plurality of sensors applied to respective parts or objects to be monitored, it being arranged that the display means are to be activated by the action of the respective sensors through associated switching circuits while the primary warning means is activated by the action of any one of the sensors through an associated common switching circuit. According to this arrangement, if an abnormality or failure of any one of parts or objects to be monitored is sensed by a respective sensor, a car driver will be given a first-warning by the primary lamp being lit up, locating then such part or object in question by the lighting of the corresponding display lamp. Usually, all of the display lamps and primary warning lamp are conveniently panelled on an overhead console in the automobile.

However, this conventional monitor system has had the problem that, in case of failures or malfunctions occurring in any one of the switching circuits for the display lamps due to possible damage of circuit elements or disconnections of circuit lines, etc., both the primary lamp and the respective display lamp are not energized even though the respective sensor has functioned satisfactorily to detect abnormalities, with the result that there is no indication of the abnormality at such corresponding part or object to be monitored.

SUMMARY OF THE INVENTION

The invention, therefore, aims to solve this problem by providing an improved centralized monitor system for motor vehicles of the "failure-proof" type in which even if any one of the switching circuits fails in operation to activate the associated display lamp, the primary warning lamp will nevertheless be lit up to allow the car driver to take precautions against such failure existent in that switching circuit.

To attain this aim, a centralized monitor system for motor vehicles according to the invention comprises a plurality of sensors applied to respective parts or objects to be monitored for detecting abnormalities thereat, a corresponding plurality of display means for indicating such respective abnormalities detected, a corresponding plurality of switching circuits connected between the respective sensors and display means so that when said sensors detect abnormalities, the respective display means are energized by said respective switching circuits, an OR circuit having input terminals thereof connected to output terminals of said sensors, a common switching circuit connected to said OR circuit, and a primary warning means adapted to be energized, independently of said display means, by said common switching circuit when abnormalities are detected by said sensor.

BRIEF DESCRIPTION OF THE DRAWINGS

The invention will now be described with reference to the accompanying drawings.

DESCRIPTION OF THE PREFERRED EMBODIMENTS

Figure 1:
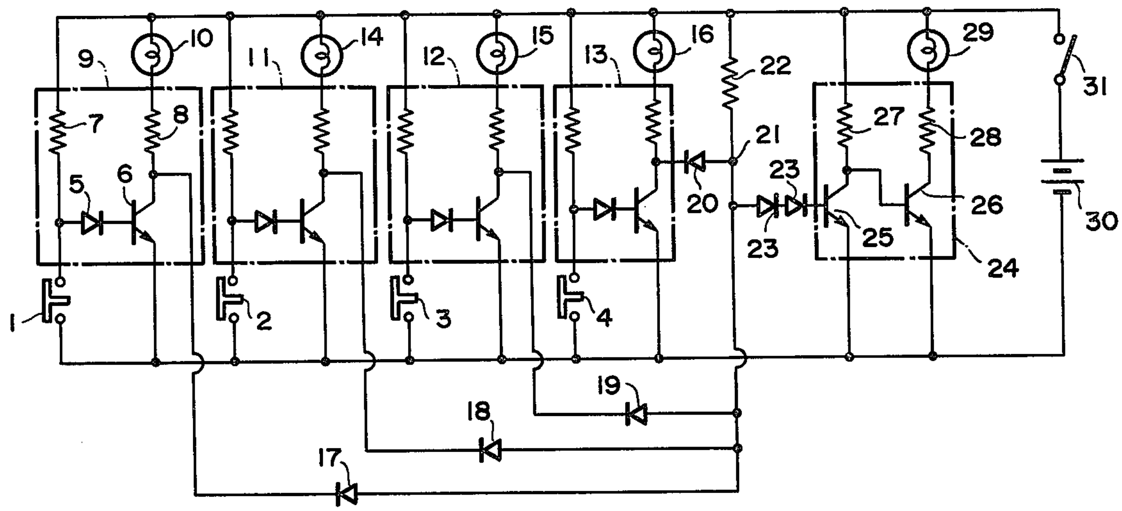
FIG. 1 PRIOR ART
FIG. 1 is a circuit diagram of a conventional prior art centralized monitor system for motor vehicles.

As shown in FIG. 1, a conventional monitor system with four monitoring items for example includes sensors 1, 2, 3 and 4 respectively disposed as attached to or associated with parts or objects to be monitored. These sensors may typically be in the form of switches for example of the type which are to be made "on" when the respective parts or objects to be monitored remain normal in operating conditions while being made "off" when the objects present abnormal operating conditions. Connected with the sensors are corresponding switching circuits 9, 11, 12 and 13 for activation of corresponding display means e.g. lamps 10, 14, 15 and 16, and connected with the switching circuits is a common switching circuit 24 for activation of a primary warning lamp 29. The switching circuit 9 for activation of the display lamp 10 comprises a diode 5, a transistor 6 and resistors 7, 8. The other switching circuits 11, 12, 13 are similarly constructed. To the collectors of the transistors in the switching circuits 9, 11, 12, 13 are connected the cathodes of diodes 17, 18, 19, 20, respectively. The anodes of these diodes 17, 18, 19, 20 in turn are connected to a common terminal 21, which terminal 21 is connected via a resistor 22 to the positive pole of a power source 30. The common terminal 21 also is connected to the common switching circuit 24 for activation of the primary warning lamp 29. The common switching circuit 24 comprises transistors 25, 26 and resistors 27, 28, the transistor 26 having its collector connected via the resistor 28 to the primary warning lamp 29. Reference numeral 31 identifies a key switch for the system.

The above described system is operated as follows. As long as all of the sensors 1, 2, 3, 4 are "on" with all individual objects to be monitored involving no malfunction or abnormality, the transistors 6 in the switching circuits 9, 11, 12, 13 are kept "off" and accordingly the display lamps 10, 14, 15, 16 are all out. Meanwhile, the electric potential of the common terminal 21 is maintained at a level of the power source 30, the transistor 25 is "on", transistor is "off", and thus the primary warning lamp 29 also remains inactive.

On the contrary, if there occur malfunctions or abnormalities at any part or object to be monitored, e.g. the one associated with the sensor 1, then the transistor 6 in the switching circuit 9 becomes "on" to light up the display lamp 10. The resultant current flow through transistor 6 and resistor 8 lowers the potential at the collector of transistor 6 and, due to the diode 17 interconnection between said collector and common terminal 21, the voltage level of the common terminal 21 is also lowered so that the transistor 25 is turned "off", transistor 26 "on", and thus the primary warning lamp 29 is energized to be lit up. This mode of warning operation is equally applicable to other sensors such as 2, 3 and 4.

However, such ordinary monitor system described so far has had the problem that in case of failures or malfunctions possibly occurring in any one of the switching circuits due to damages of circuit elements or disconnections of circuit lines, etc., it can never be possible to effect warnings of abnormalities or malfunctions at the respective object to be monitored, because not only the respective display lamp but also the primary warning lamp is not energized; this is due to the arrangement of the common switching circuit 24 being adapted to be actuated by every individual switching circuit.

The invention, therefore, is directed to solve the above problem by providing an improved centralized monitor system, which will now be described with reference to FIG. 2.

Figure 2:
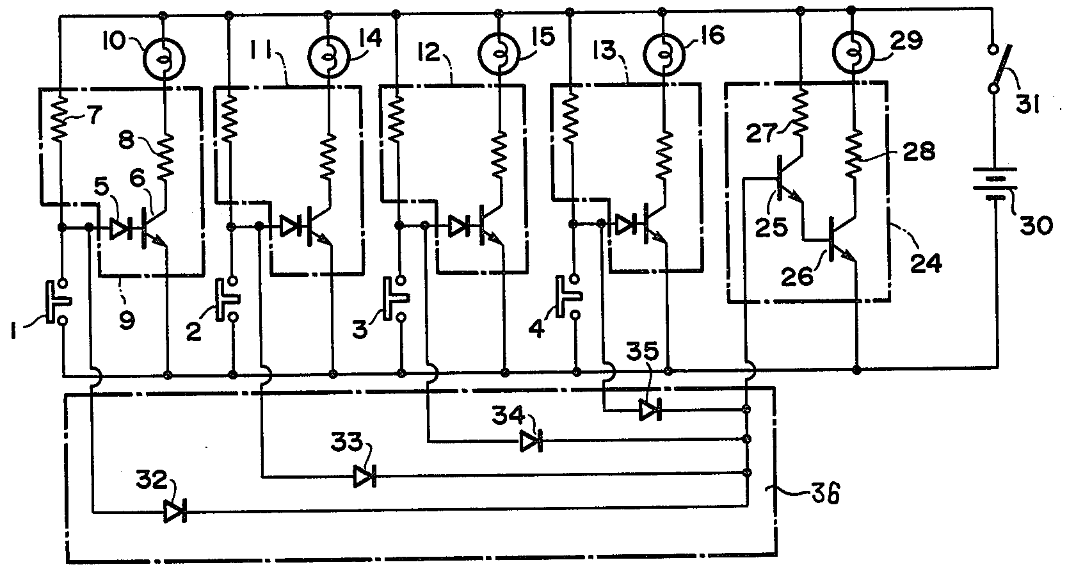
FIG. 2 is a circuit diagram of a centralized monitor system according to the invention.

As is seen in FIG. 2, the improved monitor system of the invention is essentially featured in an arrangement that the "on" and "off" signals from the sensors are applied directly from the sensors to the common switching circuit, not through the individual switching circuits. To describe further, the output terminals of the sensors 1, 2, 3 and 4 also are connected via diodes 32, 33, 34 and 35 respectively to the base of the transistor 25 in the common switching circuit 24 for the primary warning lamp. These diodes 32, 33, 34 and 35 have their respective cathodes connected in common to the base of the transistor 25 so that an OR circuit 36 is formed.

In this arrangement of the invention, of course, it will be noted that the switching circuits 9, 11, 12, 13 and display lamps 10, 14, 15, 16 are operated in the same fashion as described with reference to FIG. 1.

If any one of the sensors is made "off" in response to the occurrence of abnormalities at the respective object or part to be monitored, it results that the junction of the commonly connected cathodes of the diodes in the OR circuit 36 will be elevated in voltage level to excite the common switching circuit 24 so that the primary warning lamp 29 is lit up. This activation of the primary lamp 29, therefore, is possible independently of or with no regard to the functionings of switching circuits for the display lamps. In, operation of the primary warning lamp 29 is controllable solely by each individual sensor.

According to the invention, therefore, even in case any one or more of the individual switching circuits fail or are damaged, the primary warning lamp 29 will be activated without fail to give a warning to a car driver, who then proceeds to check the individual switching circuits for restoration of their functions to normalcy.

Although the primary and display lamps have been described and illustrated as visual warning and display means, they may of course be replaced by other types of indicator such for example as buzzers or the like.

We claim:

1. A centralized monitor system for motor vehicles comprising a plurality of sensors which are applied respectively to a plurality of vehicle components for individually monitoring the operating conditions of said plurality of vehicle components respectively, each of said sensors being operative to assume a first operating state when its associated vehicle component is in a predetermined normal operating condition and being operative to assume a second operating state when the operating condition of said component departs from said predetermined normal operating condition, a plurality of indicators one for each of said components being monitored, a plurality of switching circuits each of which has an input that is connected to a respective one of said plurality of sensors and an output that is connected to a respective one of said plurality of component indicators, a power source connected to each of said plurality of interconnected switching circuits and component indicators for energizing a selected one of said component indicators through its associated switching circuit when the sensor connected to said associated switching circuit assumes its second operating state, a further indicator adapted to be energized independently of said component indicators for providing a general warning indicative of the fact that at least one of said vehicle components has departed from its normal operating condition, a further switching circuit for selectively connecting said further indicator to said power source, and control means for controlling the operating state of said further switching circuit thereby to control the energization of said further indicator, said control means comprising an OR circuit having a plurality of input terminals and a single output terminal, said single output terminal being connected to said further switching circuit, and said plurality of input terminals being connected respectively to said plurality of sensors at the input sides of said plurality of switching circuits whereby the signal state at each of said input terminals and at said single output terminal is directly dependent upon the operating state of each sensor connected to each of said input terminals and is independent of the operating conditions of any of the plurality of interconnected switching circuits and component indicators respectively associated with said sensors.

2. A centralized monitor system according to claim 1 wherein said indicators are warning lamps.

3. A centralized monitor system according to claim 1 wherein said indicators are warning buzzers.

4. A centralized monitor system according to claim 1 wherein said OR circuit comprises a plurality of diodes corresponding in number to the sensors.

5. A centralized monitor system according to claim 4 wherein said diodes have their anodes connected to the output terminals of said sensors respectively while their cathodes are connected together to the output terminal of the OR circuit.

6. A centralized monitor system for motor vehicles which comprises: a plurality of sensors applied to respective vehicles parts or objects to be monitored for detecting abnormalities occurring thereat, each of said sensors comprising a switch which is in its "on" position when the respective part is in a predetermined normal operating condition, said switch being placed in its "off" position when the operating condition of said respective part departs from said predetermined normal operating condition; a corresponding plurality of switching circuits each including a resistor connected between the respective sensor and a power source, and an NPN-type transistor having its base connected to the junction of said respective sensor and resistor whereby the state of conduction of each transistor is dependent on the position of its associated sensor; a corresponding plurality of indicator means connected respectively to the transistors in said plurality of switching circuits, said indicator means being individually operable in response to the states of conduction of their associated transistors to indicate the "on" and "off" positions of said respective sensors; an OR circuit including a corresponding plurality of diodes each having its anode connected to said junction of the respective sensor and associated resistor, all of said diodes having their cathodes connected together at the output terminal of said OR circuit; a further switching circuit connected to the output terminal of said OR circuit to be actuated when at least one of said sensors assumes its said "off" position and a further indicator means connected to said further switching circuit to be actuated in response to the actuation of said further switching circuit.

7. A centralized monitor system for motor vehicles according to claim 6 wherein all of said indicator means are warning lamps.

8. A centralized monitor system for motor vehicles according to claim 6 wherein all of said indicator means are warning buzzers.

* * * * *